UNITED STATES PATENT OFFICE.

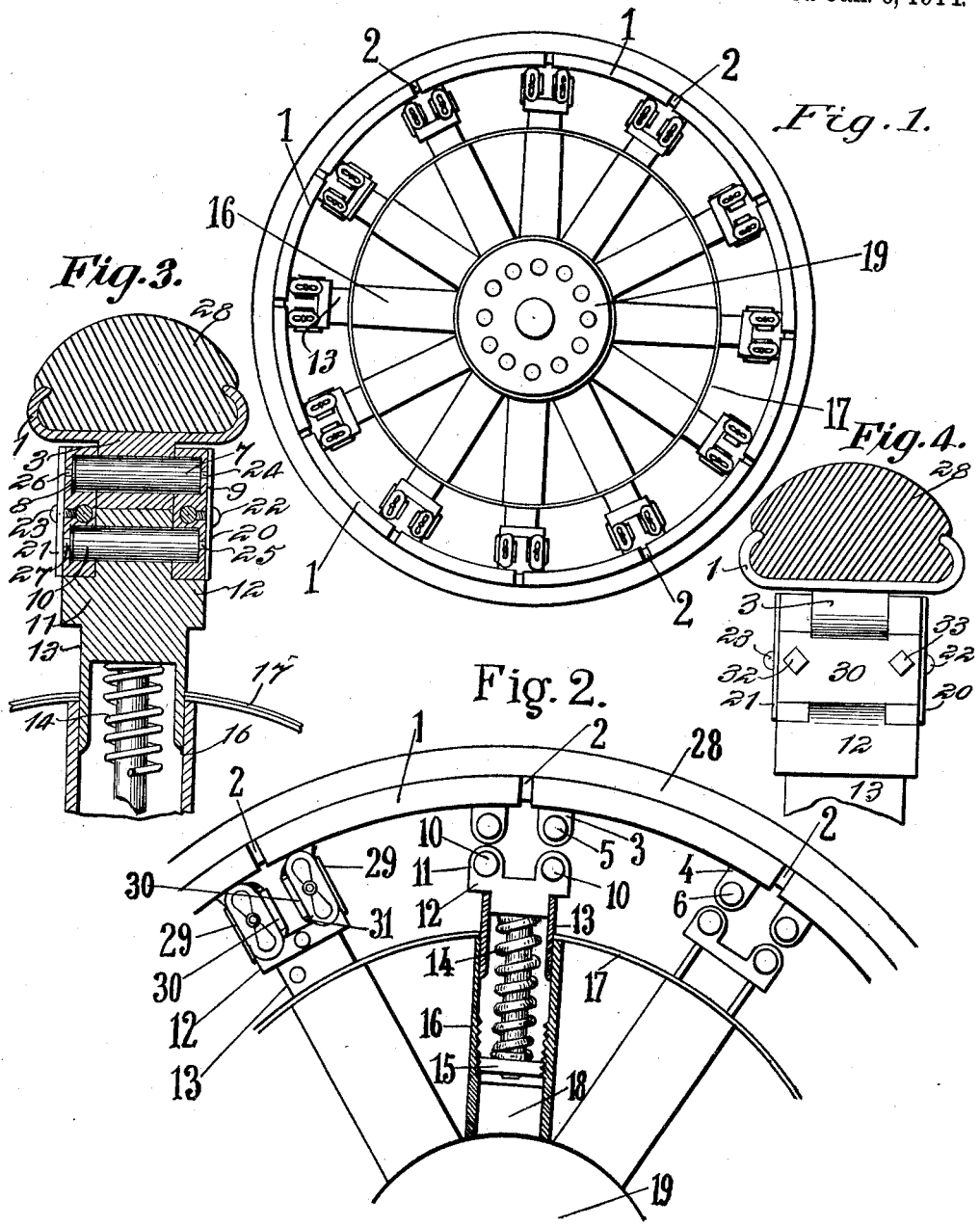

ALEJANDRO M<sup>A</sup> DE PALACIO Y GARCIA AND SANTOS RUBIO, OF ALFAFAR, SPAIN.

RESILIENT WHEEL FOR ROAD-VEHICLES.

1,083,892. Specification of Letters Patent. Patented Jan. 6, 1914.

Application filed June 20, 1912. Serial No. 704,934.

*To all whom it may concern:*

Be it known that we, ALEJANDRO M. DE PALACIO Y GARCIA and SANTOS RUBIO, subjects of the King of Spain, residing at Alfafar, Spain, have invented certain new and useful Improvements in Resilient Wheels for Road-Vehicles, of which the following is a full, clear, and exact description.

This invention relates to resilient wheels applicable for use on practically all kinds of vehicles but especially designed for motor cars.

The primary object of the invention is to provide a wheel upon which a solid tire can be used and which wheel will compare very favorably indeed with other wheels having pneumatic tires, a particular advantage of the invention being that the solid tires are comparatively inexpensive both as to initial cost and up-keep.

Our improved wheel may be broadly described as consisting of a rim formed of a number of segmental portions having lugs on their inner (hub) sides, which lugs are used in connection with other lugs, preferably of similar construction, formed upon a body which is actuated upon one or more compression springs and to which are attached tubular members containing the springs and forming the spokes of the wheel. The said segmental portions collectively form a circular channel or recess into which the solid rubber or other tire is placed, the said recess or channel being of any convenient cross section but preferably that which may be described as of elongated C-shape.

In the accompanying drawings, one way of carrying out our invention is shown by way of example.

Figure 1. shows the resilient wheel in elevation. Fig. 2. shows a part of Fig. 1. on an enlarged scale a portion being shown in section. Fig. 3. is a cross section of the spring actuated parts. Fig. 4. is a section through part of the wheel, showing the parts of Fig. 3. in elevation.

In this example the wheel is composed of a number of equal segmental portions 1 which constitute the rim of the wheel. A space 2 is provided between the adjoining ends of all the segments. Each segment 1 has two lugs 3 and 4, with bores 5 and 6 within which cylindrical pins 7 are arranged, the projecting extremities of these pins fit into bores in the side pieces 8 and 9 which have other similar bores, adapted to receive cylindrical pins 10 similar to the pins 7. Each of these pins 10 passes through a bore in the lugs 11 of which two are provided at the ends of a plate 12 which plate is fixed at the extremity of a tube 13. The plates 12 serve as supports for the compression springs 14 at one side, while at the other side these springs rest upon washers 15, within the tubes 16, which washers are screw threaded for the purpose of enabling radial adjustment of the springs. All the tubes 16 are surrounded by a solid annulus 17 into which they terminate with their outer extremities while their inner extremities have short wooden ends 18 assembled together at the hub 19 of the wheel. The entire arrangement of the spoke portions 18 the tubes 16 and 13 and the plates 12 together form the spokes of the wheel and are rendered resilient by the action of the springs 14. For the sake of clearness the side pieces between the ends 3, 4 and 11 which connect the spokes to the rim are left out in two of the spokes in Fig. 2. Cover plates 20 and 21 are provided on the faces of the side pieces and are fixed by means of screws 22 and 23. The said cover plates serve to protect the oil holes 24, 25, 26 and 27. The lugs 11, 11 of the plates 12 each correspond with a lug of two successive segmental portions. The segments 1 which are grooved form in their entirety an annular recess adapted to receive the solid rubber tire 28. At the sides of each pair of lugs small plates 29, 30 are arranged and between the lugs, pieces of solid rubber are provided. The plates 29, 30 are fixed by means of bolts 32, 33.

A wheel constructed in the aforesaid manner, and in which the rim consists of a number of distinct parts, the extremities of which are connected to the extremities of the resilient spokes constitutes a resilient entirety of such spokes which adapts itself to meet all obstacles in the road and to uneven ground, and if substituted for a pneumatic tire will answer all requirements and can be used with great advantage as regards durability and economy.

As above stated the wheel which is shown in the drawings and hereinbefore described is only one example of carrying out our invention, which may vary in its constructional details without departing from the spirit of the invention.

Having now particularly described and ascertained the nature of our said invention and in what manner the same is to be performed, we declare that what we claim is:—

The combination of a hub, hollow spokes thereon, said spokes comprising telescopic sections, tread segments, each segment being provided with lugs at the ends thereof, a pair of lugs on the outer section of each spoke, links connecting the lugs on adjacent sections to the pair of lugs on each spoke, a rod attached on the outer section of each spoke, a washer fixed on the inner section of each spoke provided with an opening through which said rod is guided, and a compression-spring arranged between the outer section of each spoke and said washer.

In witness whereof, we subscribe our signatures, in the presence of two witnesses.

ALEJANDRO M$^A$ DE PALACIO Y GARCIA.
SANTOS RUBIO,

Witnesses:
CARLOS DUPUY DE LÔME,
ROBERT FRAZER, Jr.,
M. ZORRILLA.